(12) United States Patent
Isowaki et al.

(10) Patent No.: US 12,068,009 B2
(45) Date of Patent: Aug. 20, 2024

(54) MAGNETIC RECORDING DEVICE, MAGNETIC RECORDING SYSTEM, AND CONTROL METHOD FOR MAGNETIC RECORDING DEVICE

(71) Applicant: KABUSHIKI KAISHA TOSHIBA, Tokyo (JP)

(72) Inventors: Yousuke Isowaki, Yokohama Kanagawa (JP); Kazuaki Okamoto, Yokohama Kanagawa (JP); Kenichiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 18/364,546

(22) Filed: Aug. 3, 2023

(65) Prior Publication Data
US 2024/0242733 A1 Jul. 18, 2024

(30) Foreign Application Priority Data
Jan. 16, 2023 (JP) .................................. 2023-004648

(51) Int. Cl.
*G11B 5/00* (2006.01)
*G11B 5/012* (2006.01)
(Continued)

(52) U.S. Cl.
CPC ............ *G11B 5/4813* (2013.01); *G11B 5/012* (2013.01); *G11B 2005/0021* (2013.01)

(58) Field of Classification Search
CPC ......... G11B 5/82; G11B 5/584; G11B 5/5922; G11B 15/473; G11B 20/833; G11B 5/58;
(Continued)

(56) References Cited

U.S. PATENT DOCUMENTS 10,381,040 B1  8/2019  Boyle et al.
11,437,069 B2 * 9/2022  Matsumoto ........ G11B 33/1426
(Continued)

FOREIGN PATENT DOCUMENTS

JP  2022-62525 A  4/2022

OTHER PUBLICATIONS

Eric Brewer et al., "Disks for Data Centers: White paper for FAST 2016," https://research.google/pubs/pub44830/, 16 pages (2016).

*Primary Examiner* — Nabil Z Hindi
(74) *Attorney, Agent, or Firm* — Finnegan, Henderson, Farabow, Garrett & Dunner, LLP (57) ABSTRACT

According to one embodiment, a magnetic recording device includes a magnetic recording medium group and a magnetic head group. The magnetic recording medium group includes a first magnetic recording medium, a plurality of second magnetic recording media, and a plurality of third magnetic recording media. The magnetic head group includes a first magnetic head, a plurality of second magnetic heads, and a plurality of third magnetic heads. The first magnetic head is configured to record data on the first magnetic recording medium by a first method. One of the plurality of second magnetic heads is configured to record data on one of the plurality of second magnetic recording media by a second method different from the first method. One of the plurality of third magnetic heads is configured to record data on one of the plurality of third magnetic recording media by the second method.

20 Claims, 5 Drawing Sheets

(51) Int. Cl.
  *G11B 5/48*     (2006.01)
  *G11B 13/08*    (2006.01)
  *G11B 33/14*    (2006.01)

(58) Field of Classification Search
  CPC ............... G11B 5/012; G11B 19/2072; G11B
        2220/2516; G11B 20/1258; G11B 5/743;
        G11B 5/455; G11B 5/09; G11B 11/0513;
        G11B 11/10531; G11B 11/10595; G11B
             2005/0021; G11B 5/54; G11B 27/36
  USPC ..................................................... 360/48, 75
  See application file for complete search history.

(56)          References Cited

U.S. PATENT DOCUMENTS

2019/0227898 A1    7/2019  Gaertner et al.
  2022/0115039 A1    4/2022  Matsumoto et al.

* cited by examiner

MAGNETIC RECORDING DEVICE, MAGNETIC RECORDING SYSTEM, AND CONTROL METHOD FOR MAGNETIC RECORDING DEVICE

CROSS-REFERENCE TO RELATED APPLICATIONS

This application is based upon and claims the benefit of priority from Japanese Patent Application No. 2023-004648, filed on Jan. 16, 2023; the entire contents of which are incorporated herein by reference.

FIELD

Embodiments described herein relate generally to a magnetic recording device, a magnetic recording system, and a control method for a magnetic recording device.

BACKGROUND

Information is recorded on a magnetic recording medium such as an HDD (Hard Disk Drive) using a magnetic head. Stable recording operations are desired in magnetic recording devices.

DETAILED DESCRIPTION

According to one embodiment, a magnetic recording device includes a magnetic recording medium group and a magnetic head group. The magnetic recording medium group includes a first magnetic recording medium, a plurality of second magnetic recording media, and a plurality of third magnetic recording media. The magnetic head group includes a first magnetic head, a plurality of second magnetic heads, and a plurality of third magnetic heads. The first magnetic head is configured to record data on the first magnetic recording medium by a first method. One of the plurality of second magnetic heads is configured to record data on one of the plurality of second magnetic recording media by a second method different from the first method. One of the plurality of third magnetic heads is configured to record data on one of the plurality of third magnetic recording media by the second method. The first magnetic recording medium is provided between the plurality of second magnetic recording media and the plurality of third magnetic recording media in a first direction. No other magnetic recording medium on which data is recorded by the second method is provided between the plurality of first magnetic recording media Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1:
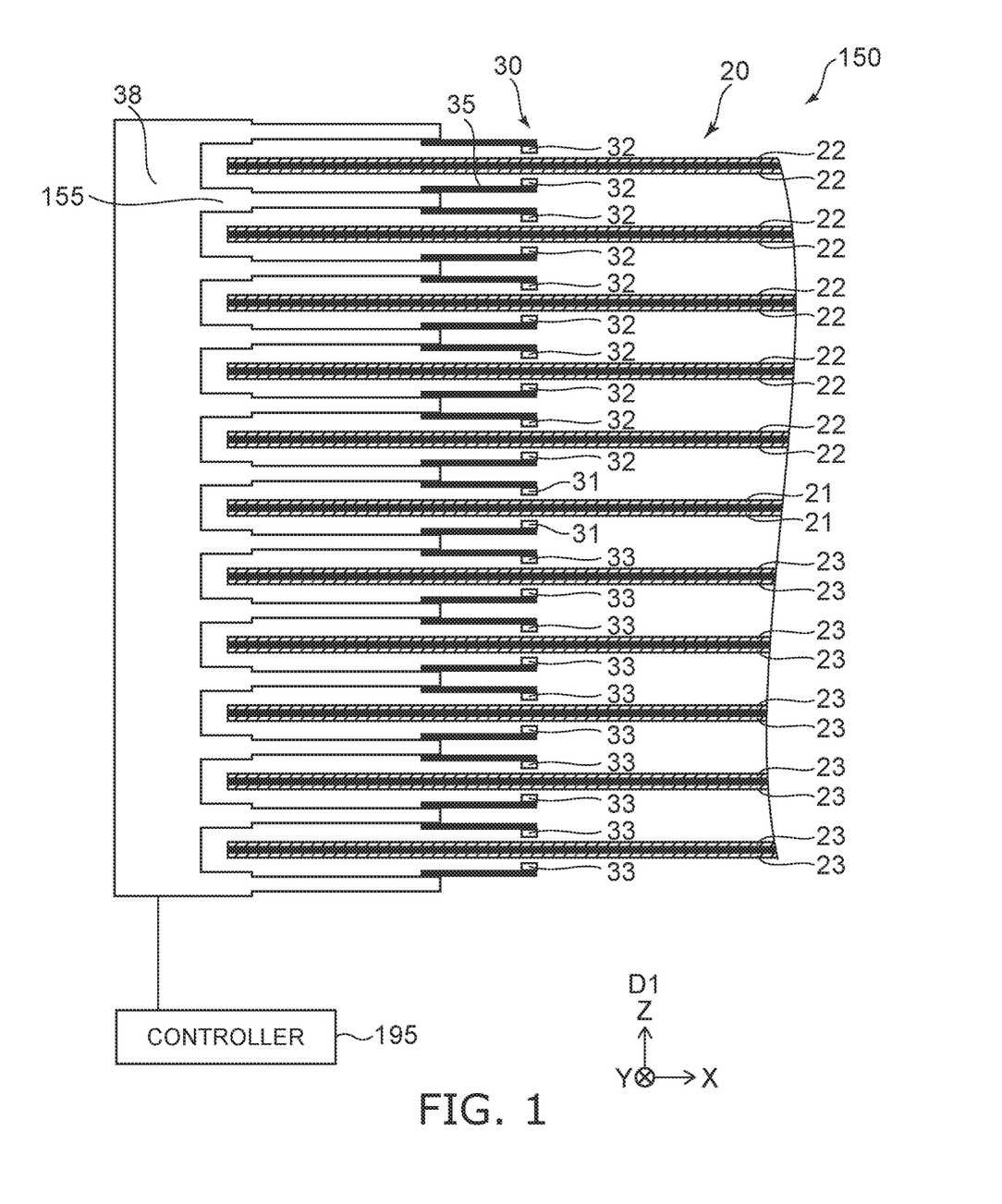
FIG. 1 is a schematic cross-sectional view illustrating a magnetic recording device according to a first embodiment.

FIG. 1 is a schematic cross-sectional view illustrating a magnetic recording device according to a first embodiment.

As shown in FIG. 1, a magnetic recording device 150 according to the embodiment includes a magnetic recording medium group 20 and a magnetic head group 30.

The magnetic recording medium group 20 includes a first magnetic recording medium 21, a plurality of second magnetic recording media 22, and a plurality of third magnetic recording media 23. The number of the first magnetic recording medium 21 may be one or more.

The first magnetic recording medium 21 is provided between the plurality of second magnetic recording media 22 and the plurality of third magnetic recording media 23 in a first direction D1. The first direction D1 is defined as a Z-axis direction. One direction perpendicular to the Z-axis direction is defined as an X-axis direction. A direction perpendicular to the Z-axis direction and the X-axis direction is defined as a Y-axis direction.

The magnetic recording media are layered extending along the X-Y plane. The magnetic recording media are disc-shaped.

The magnetic recording media are recording layers. For example, one magnetic recording medium can be provided on a first side of the substrate and another magnetic recording medium can be provided on a second side of the substrate. The configuration (material, crystal structure, etc.) of the first magnetic recording medium 21 may be different from the configuration of the plurality of second magnetic recording media 22 and may be different from the configuration of the plurality of third magnetic recording media 23. The configuration (material, crystal structure, etc.) of the substrate on which the first magnetic recording medium 21 is provided may be different from that of the substrate on which the plurality of second magnetic recording media 22 are provided, and may be different from that of the substrate on which the plurality of third magnetic recording media 23 are provided.

The magnetic head group 30 includes a first magnetic head 31, a plurality of second magnetic heads 32 and a plurality of third magnetic heads 33. The first magnetic head 31, the plurality of second magnetic heads 32, and the plurality of third magnetic heads 33 may overlap, for example, along the first direction D1.

For example, a plurality of arms 155 are provided at a base 38. The plurality of arms 155 are arranged, for example, along the first direction D1. For example, a suspension assembly 35 is fixed to each of the plurality of arms 155. The suspension assembly 35 is, for example, a head gimbal assembly. Each of the multiple magnetic heads is fixed to one of the plurality of suspension assemblies 35. One of the plurality of magnetic heads faces one of the plurality of magnetic recording media (recording layers).

The first magnetic head 31 is configured to record data on the first magnetic recording medium 21 by a first method. One of the plurality of second magnetic heads 32 is configured to record data on one of the plurality of second magnetic recording media 22 by a second method. The second method differs from the first method. One of the plurality of third magnetic heads 33 is configured to record data on one of the plurality of third magnetic recording media 23 by the second method.

The first method includes, for example, a thermally-assisted magnetic recording. The second method includes methods other than the thermally-assisted magnetic recording. For example, the second method includes any one of magnetization control assisted magnetic recording, current assisted magnetic recording, and microwave assisted magnetic recording.

In the thermally-assisted magnetic recording, a portion of the magnetic recording medium is locally heated. Data is efficiently recorded in the heated area. In the magnetization control assisted magnetic recording, the magnetization of the magnetic element provided in the magnetic head is controlled to efficiently direct the recording magnetic field generated from the magnetic head toward the magnetic recording medium. In the current-assisted magnetic recording, the responsiveness of the magnetic head is improved by providing a current through the main pole of the magnetic head. In the microwave assisted magnetic recording, a microwave magnetic field generated by a magnetic element provided in a magnetic head is locally applied to a magnetic recording medium. Data is efficiently recorded in the area to which the microwave magnetic field is applied.

As described above, the first magnetic recording medium 21 to which the first method is applied is provided in the first direction D1 between the plurality of second magnetic recording media 22 to which the second method is applied and the plurality of third magnetic recording media 23 to which the second method is applied. No other magnetic recording medium on which data is recorded by the first method overlaps the magnetic recording medium group 20 in the first direction D1.

In the embodiment, the first magnetic recording medium 21 to which the first method is applied is provided at the center portion of the magnetic recording medium group 20 in the first direction D1. The central portion is sandwiched between the plurality of second magnetic recording media 22 and the plurality of third magnetic recording media 23 to which the second method is applied. Thereby, a more stable recording operation can be obtained. According to the embodiment, a magnetic recording apparatus capable of stable recording operation can be provided.

For example, in the thermally assisted magnetic recording, when the recording operation is repeated, the characteristics of the magnetic head tend to change. The change in characteristics is considered to be due to thermal effects. For example, it has a short life.

For example, target recording characteristics are set in the first magnetic head 31, the second magnetic heads 32, and the third magnetic heads 33. The number of times of recording that the desired recording characteristics can be maintained corresponds to the lifetime. The lifetime of the first magnetic head 31 is shorter than the lifetime of one of the plurality of second magnetic heads 32. The lifetime of the first magnetic head 31 is shorter than the lifetime of one of the plurality of third magnetic heads 33.

For example, in the first magnetic head 31, the number of times of recording that the desired recording characteristics can be maintained is defined as a first number of times of recording. In one of the plurality of second magnetic heads 32, the number of times of recording that the desired recording characteristics can be maintained is defined as a second number of times of recording. In one of the plurality of third magnetic heads 33, the number of times of recording that can maintain the target recording characteristics is defined as a third number of times of recording. The first number of times of recording is smaller than the second number of times of recording. The first number of times of recording is smaller than the third number of times of recording.

On the other hand, for example, in the magnetic recording by the first method, it is easy to obtain a recording density higher than that in the magnetic recording by the second method. For example, the first recording density of the first magnetic recording medium 21 is higher than the second recording density of the plurality of second magnetic recording media 22. The first recording density is higher than the third recording density in the plurality of third magnetic recording media 23. Thus, in the first method, although a high recording density can be obtained, the recording characteristics tend to change as the number of recording operations increases.

In the embodiment, the first magnetic recording medium 21 corresponding to the first magnetic head 31 to which the first method is applied in which the recording characteristics are easily changed by the recording operation is provided at the center portion of the magnetic recording medium group 20. In the center portion of the magnetic recording medium group 20, for example, vibration is small. For example, a first vibration in the position of the first magnetic recording medium 21 (and the first magnetic head 31) is smaller than a second vibration in at least any position of the plurality of second magnetic recording medium 22 (and the plurality of second magnetic heads 32). The first vibration is smaller than a third vibration in at least any position of the plurality of third magnetic recording media 23 (and the plurality of third magnetic heads 33). A higher recording density is obtained in the first magnetic recording medium 21 in which vibration is suppressed.

As described above, it is preferable that the recording frequency on the first magnetic recording medium 21 to which the first method is applied is set low. Thereby, a high recording density can be stably obtained in the first magnetic recording medium 21. For example, a first recording frequency of recording on the first magnetic recording medium 21 is lower than a second recording frequency of recording on the plurality of second magnetic recording media 22. The first recording frequency is lower than a third recording frequency of recording on the plurality of third magnetic recording media 23. Such control may be performed by the controller 195 illustrated in FIG. 1. Example of the operation of the controller 195 will be described later.

The magnetic recording medium group 20 may include a plurality of first magnetic recording media 21 (see FIG. 1). The magnetic head group 30 may include a plurality of first magnetic heads 31. One of the plurality of first magnetic heads 31 can record data on one of the plurality of first magnetic recording media 21 by the first method. For example, other magnetic recording media on which data is recorded by the second method are not provided between the plurality of first magnetic recording media 21.

The absolute value of the difference between the number of the plurality of second magnetic recording media 22 and the number of the plurality of third magnetic recording media 23 is, for example, 2 or less. As a result, the first magnetic recording medium 21 to which the first method is applied is located in the center portion of the group of magnetic recording media. The absolute value of the difference may be 1. The absolute value of the difference may be 0.

The magnetic recording of the first method and the second method may be combined with conventional magnetic recording (CMR), shingled magnetic recording (SMR), or interlaced magnetic recording (IMR). For example, the first method includes one of CMR, SMR, and IMR. The second method includes one of CMR, SMR, and IMR.

A high recording density can be easily obtained in SMR and IMR. For example, the first method preferably includes SMR. Alternatively, the first method preferably includes IMR. Alternatively, the second method may include CMR.

Example of control of the recording operation by the controller 195 will be described below. The controller 195 is configured to control the magnetic recording medium group 20 and the magnetic head group 30.

Figure 2:
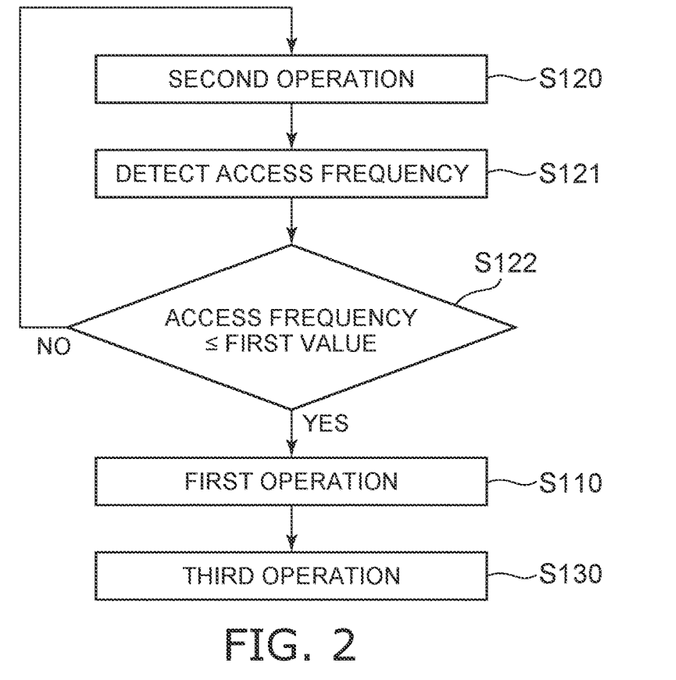
FIG. 2 is a flow chart illustrating an operation of the magnetic recording device according to the first embodiment.

FIG. 2 is a flow chart illustrating an operation of the magnetic recording device according to the first embodiment.

As shown in FIG. 2, the controller 195 is configured to perform a first operation (step S110) and a second operation (step S120). The controller 195 records recording data on the first magnetic recording medium 21 in the first operation. In the second operation, the controller 195 records recording data on at least one of the plurality of second magnetic recording media 22 or the plurality of third magnetic recording media 23. The second operation is performed before the first operation.

As shown in FIG. 2, when the second operation is performed, the controller 195 detects access frequency to the plurality of second magnetic recording media 22 and the plurality of third magnetic recording media 23 (step S121).

The controller 195 compares the access frequency to recorded data recorded on the at least one of the plurality of second magnetic recording media 22 or the plurality of third magnetic recording media 23 with a first value (step S122). The first value may be predetermined, for example. The first value can be stored in a memory. In the case where the access frequency is equal to or less than the first value, the controller 195 performs the first operation (step S110).

If the access frequency is not equal to or less than the first value, the controller 195 returns to the second operation (step S120) and continues processing.

In the first operation (step S110), the controller 195 records the data recorded in the at least one of the plurality of second magnetic recording media 22 or the plurality of third magnetic recording media 23 to the first magnetic recording medium 21. For example, swap of the records is performed.

In the case where the access frequency to recorded data is equal to or lower than the first value, the recorded data is recorded on the first magnetic recording medium 21 at a high recording density. The recording areas of the second magnetic recording medium 22 and the third magnetic recording medium 23 can be used for recording other data by swapping the recorded data with a low access frequency.

As shown in FIG. 2, the controller 195 may perform a third operation (step S130). In the third operation, the controller 195 records other data at the position where the swapped recording data has been recorded of the at least one of the plurality of second magnetic recording media 22 or the plurality of third magnetic recording media 23.

According to the embodiment, an appropriate recording operation can be performed in accordance with the characteristics of the first method and the second method. A recording operation of high recording density can be stably performed.

Figure 3:
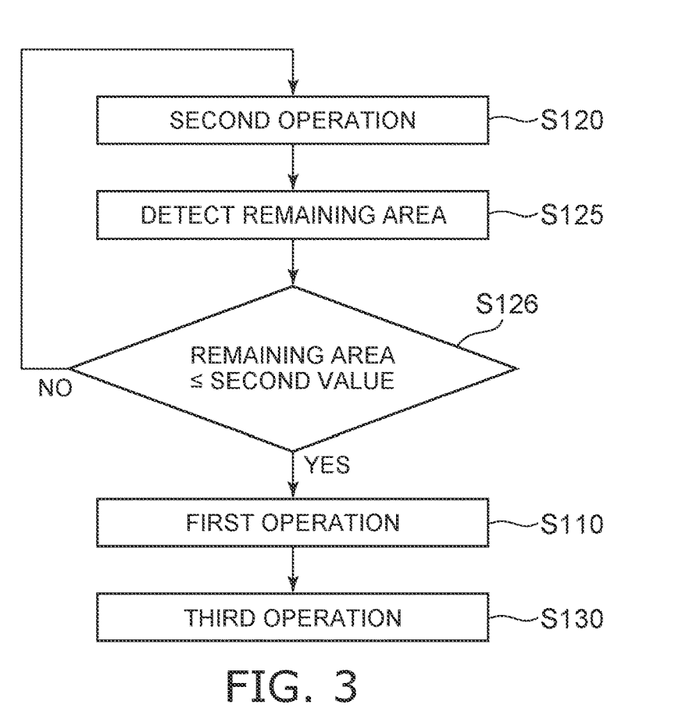
FIG. 3 is a flow chart illustrating an operation of the magnetic recording device according to the first embodiment.

FIG. 3 is a flow chart illustrating an operation of the magnetic recording device according to the first embodiment.

FIG. 3 exemplifies another operation of the controller 195. As shown in FIG. 3, also in this example, the controller 195 records recording data on at least one of the plurality of second magnetic recording media 22 or the plurality of third magnetic recording media 23 in the second operation. The second operation is performed before the first action.

As shown in FIG. 3, the controller 195 detects the remaining recording area of at least one of the plurality of second magnetic recording media 22 or the plurality of third magnetic recording media 23 (step S125).

The controller 195 compares the rest of the recording area of at least one of the plurality of second magnetic recording media 22 and the plurality of third magnetic recording media 23 with a second value (step S126). The second value may, for example, be predetermined. The second value can be stored in the memory.

In the case where the remaining recording area becomes equal to or less than the second value, the controller performs the first operation (step S110).

In the case where the remaining recording area is not equal to or less than the second value, the controller 195 returns to the second operation (step S120) and continues processing.

Also in this example, in the first operation (step S110), the controller 195 records the recording data recorded in at least one of the plurality of second magnetic recording media 22 or the plurality of third magnetic recording media 23 in the first magnetic recording medium 21. For example, the swap of records is performed.

As shown in FIG. 3, the controller 195 may perform the third operation (step S130). In the example shown in FIG. 3, according to the embodiment, appropriate recording operation can be performed according to the characteristics of the first method and the second method. A recording operation with a high recording density can be stably performed.

In the examples of FIGS. 2 and 3, the first operation may include updating the correspondence between the logical addresses for the recorded data and the physical addresses for the recorded data.

Figure 4:
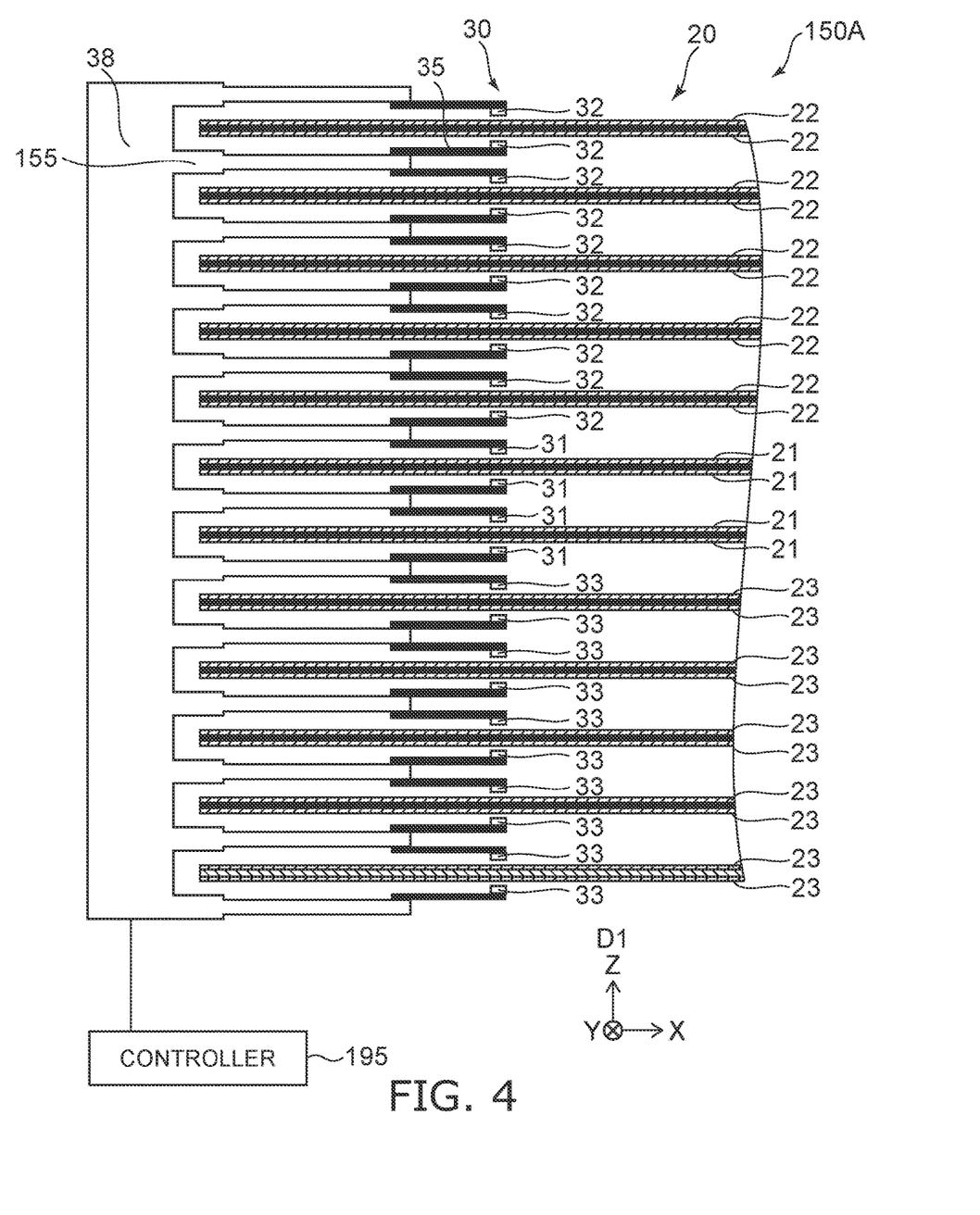
FIG. 4 is a schematic cross-sectional view illustrating a magnetic recording device according to the first embodiment.

FIG. 4 is a schematic cross-sectional view illustrating a magnetic recording device according to the first embodiment.

As shown in FIG. 4, in a magnetic recording device 150A according to the embodiment, the number of the plurality of first magnetic recording media 21 may be four or more. Also in the magnetic recording device 150A, a magnetic recording device capable of stable recording operation can be provided.

Figure 5:
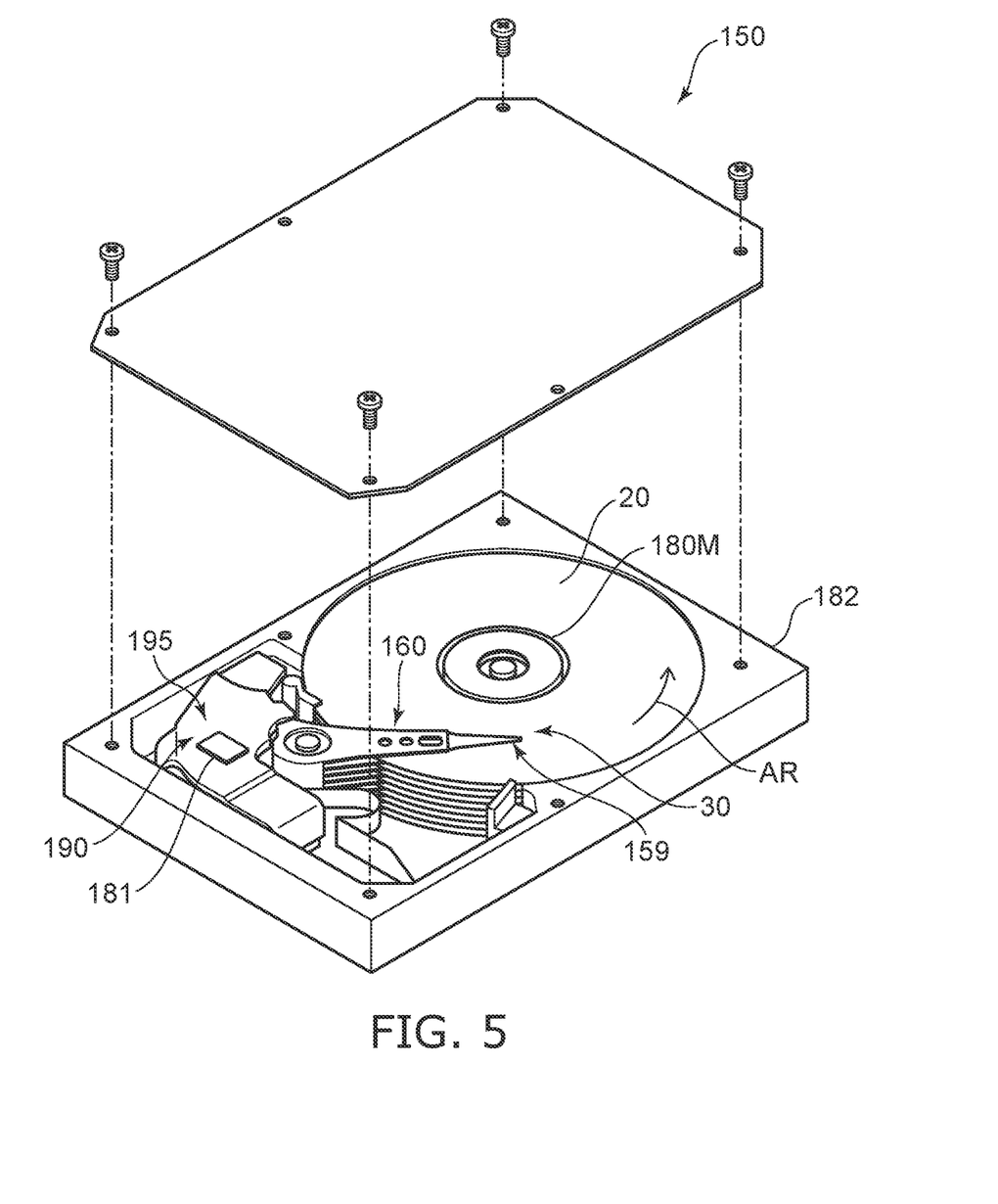
FIG. 5 is a schematic perspective view illustrating a magnetic recording device according to the embodiment.

FIG. 5 is a schematic perspective view illustrating a magnetic recording device according to the embodiment.

As shown in FIG. 5, the magnetic recording device 150 includes a housing 182, for example. The magnetic recording medium group 20 and a magnetic head group 30 are provided in the housing 182.

A rotary actuator is used in the magnetic recording device 150 according to the embodiment. The magnetic recording medium group 20 is a plurality of recording medium disks. The plurality of recording medium disks are mounted on spindle motor 180M. The plurality of recording medium disks are rotated in the direction of arrow AR by the spindle motor 180M. The spindle motor 180M is responsive to control signals from the drive controller. The magnetic recording device 150 may include recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

A head slider 159 is provided at the end of the head stack assembly 160. The magnetic head included in the magnetic head group 30 is provided at the head slider 159.

Figure 6:
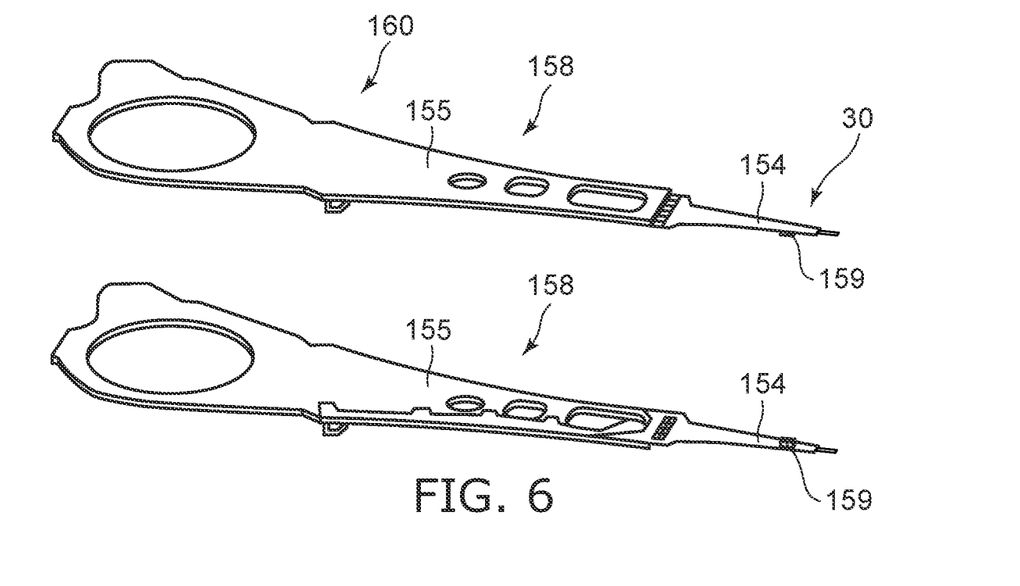
FIG. 6 is a schematic perspective view illustrating a part of the magnetic recording device according to the embodiment.

FIG. 6 is a schematic perspective view illustrating a part of the magnetic recording device according to the embodiment.

As shown in FIG. 6, a head gimbal assembly 158 has the arm 155 and a suspension 154 extending from the arm 155. The head slider 159 is provided at the end of the suspension 154.

Second Embodiment

The second embodiment relates to a magnetic recording system. The magnetic recording system includes the magnetic recording device (the magnetic recording device 150 or the magnetic recording device 150A) and the controller 195. The controller 195 may be provided separately from the magnetic recording device (the magnetic recording device 150 or the magnetic recording device 150A).

Third Embodiment

The third embodiment relates to a magnetic recording method. The magnetic recording method performs at least a part of the operation of the controller 195 described above. The magnetic recording method capable of stable recording operation can be applied.

The embodiments may include the following configurations (for example, technical proposals).

Configuration 1
   A magnetic recording device, comprising:
   a magnetic recording medium group, including
      a first magnetic recording medium,
      a plurality of second magnetic recording media, and
      a plurality of third magnetic recording media; and
   a magnetic head group, including
      a first magnetic head,
      a plurality of second magnetic heads, and
      a plurality of third magnetic heads,
   the first magnetic head being configured to record data on the first magnetic recording medium by a first method,
   one of the plurality of second magnetic heads being configured to record data on one of the plurality of second magnetic recording media by a second method different from the first method,
   one of the plurality of third magnetic heads being configured to record data on one of the plurality of third magnetic recording media by the second method,
   the first magnetic recording medium being provided between the plurality of second magnetic recording media and the plurality of third magnetic recording media in a first direction, and
   no other magnetic recording medium overlapping the magnetic recording medium group in the first direction, data being recorded on the other magnetic recording medium by the first method.

Configuration 2
   The magnetic recording device according to Configuration 1, wherein
      the magnetic recording medium group includes a plurality of the first magnetic recording media,
      the magnetic head group includes a plurality of the first magnetic heads,
      one of the plurality of first magnetic heads is configured to record data on one of the plurality of first magnetic recording media by the first method, and
      no other magnetic recording medium on which data is recorded by the second method is provided between the plurality of first magnetic recording media.

Configuration 3
   The magnetic recording device according to Configuration 1 or 2, wherein
      an absolute value of a difference between a number of the plurality of second magnetic recording media and a number of the plurality of third magnetic recording media is 2 or less.

Configuration 4
   The magnetic recording device according to any one of Configurations 1-3, wherein
      the first method includes a thermally-assisted magnetic recording.

Configuration 5
   The magnetic recording device according to Configuration 4, wherein
      the second method includes one of a magnetization control assisted magnetic recording, a current assisted magnetic recording, and a microwave assisted magnetic recording.

Configuration 6
   The magnetic recording device according to Configuration 5, wherein
      the first method includes an SMR (Shingled Magnetic Recording).

Configuration 7
   The magnetic recording device according to Configuration 6, wherein
      the second method includes a CMR (Conventional Magnetic Recording).

Configuration 8
   The magnetic recording device according to Configuration 5, wherein
      the first method includes one of a CMR (Conventional Magnetic Recording), an SMR (Shingled Magnetic Recording), and an IMR (interlaced magnetic recording), and
      the second method includes one of the CMR, the SMR, and the IMR.

Configuration 9
   The magnetic recording device according to any one of Configurations 1-8, wherein
      a first vibration at a position of the first magnetic recording medium is smaller than a second vibration at a position of at least one of the plurality of second magnetic recording media, and
      the first vibration is smaller than a third vibration at a position of at least one of the plurality of third magnetic recording media.

Configuration 10
   The magnetic recording device according to any one of Configurations 1-9, wherein
      a first recording frequency of recording on the first magnetic recording medium is lower than a second recording frequency of recording on the plurality of second magnetic recording media, and the first recording frequency is lower than a third recording frequency of recording on the plurality of third magnetic recording media.

Configuration 11

The magnetic recording device according to any one of Configurations 1-10, wherein a first recording density in the first magnetic recording medium is higher than a second recording density in the plurality of second magnetic recording media, and the first recording density is higher than a third recording density in the plurality of third magnetic recording media.

Configuration 12

The magnetic recording device according to any one of Configurations 1-11, wherein a first recording number of times at which a desired recording characteristic can be maintained in the first magnetic head is smaller than a second recording number of times at which the recording characteristics can be maintained in one of the plurality of second magnetic heads, and the first recording number of times is smaller than a third recording number of times at which the recording characteristics can be maintained in one of the plurality of third magnetic heads.

Configuration 13

The magnetic recording device according to any one of Configurations 1-12, further comprising:

a controller configured to control the magnetic recording medium group and the magnetic head group, the controller being configured to perform a first operation, in the first operation, the controller records recording data recorded on at least one of the plurality of second magnetic recording media or the plurality of third magnetic recording media on the first magnetic recording media.

Configuration 14

The magnetic recording device according to Configuration 13, wherein the controller is configured to perform the first operation in a case where an access frequency to the recording data recorded on the at least one of the plurality of second magnetic recording media or the plurality of third magnetic recording media is a first value or less.

Configuration 15

The magnetic recording device according to Configuration 13, wherein the controller is configured to perform the first operation in a case where a remained area of the at least one of the plurality of second magnetic recording media or the plurality of third magnetic recording media becomes a second value or less.

Configuration 16

The magnetic recording device according to Configuration 14 or 15, wherein the controller is configured to perform a second operation before the first operation, and the controller records the recording data in at least one of the plurality of second magnetic recording media or the plurality of third magnetic recording media in the second operation.

Configuration 17

The magnetic recording device according to any one of Configurations 14-16, wherein the first operation includes updating a correspondence between a logical address relating to the recording data and a physical address relating to the recording data.

Configuration 18

The magnetic recording device according to Configuration 14 or 15, wherein the controller is configured to perform a third operation, and in the third operation, the controller records other data at a position where the recording data being recorded of the at least one of the plurality of second magnetic recording media or the plurality of third magnetic recording media.

Configuration 19

A magnetic recording system, comprising:

the magnetic recording device according to any one of Configurations 1 to 12; and a controller, the controller being configured to control the magnetic recording medium group and the magnetic head group, the controller being configured to perform a first operation, in the first operation, the controller being configured to record recording data recorded on at least one of the plurality of second magnetic recording media or the plurality of third magnetic recording media on the first magnetic recording media.

Configuration 20

A method for control a magnetic recording device, comprising:

controlling the magnetic recording device, the magnetic recording device, including:

a magnetic recording medium group, including a first magnetic recording medium, a plurality of second magnetic recording media, and a plurality of third magnetic recording media; and a magnetic head group, including a first magnetic head, a plurality of second magnetic heads, and a plurality of third magnetic heads, the first magnetic head being configured to record data on the first magnetic recording medium by a first method, one of the plurality of second magnetic heads being configured to record data on one of the plurality of second magnetic recording media by a second method different from the first method, one of the plurality of third magnetic heads being configured to record data on one of the plurality of third magnetic recording media by the second method, the first magnetic recording medium being provided between the plurality of second magnetic recording media and the plurality of third magnetic recording media in a first direction, and no other magnetic recording medium overlapping the magnetic recording medium group in the first direction, data being recorded on the other magnetic recording medium by the first method, in the controlling, performing a first operation, in the first operation, recording data recorded on at least one of the plurality of second magnetic recording media and the plurality of third magnetic recording media are recorded on the first magnetic recording media.

According to the embodiments, it is possible to provide a magnetic recording device, a magnetic recording system capable of stable recording operation.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording devices such as magnetic recording media, magnetic heads, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices practicable by an appropriate design modification by one skilled in the art based on the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording device, comprising:
   a magnetic recording medium group, including
      a first magnetic recording medium,
      a plurality of second magnetic recording media, and
      a plurality of third magnetic recording media; and
   a magnetic head group, including
      a first magnetic head,
      a plurality of second magnetic heads, and
      a plurality of third magnetic heads,
   the first magnetic head being configured to record data on the first magnetic recording medium by a first method,
   one of the plurality of second magnetic heads being configured to record data on one of the plurality of second magnetic recording media by a second method different from the first method,
   one of the plurality of third magnetic heads being configured to record data on one of the plurality of third magnetic recording media by the second method,
   the first magnetic recording medium being provided between the plurality of second magnetic recording media and the plurality of third magnetic recording media in a first direction, and
   no other magnetic recording medium overlapping the magnetic recording medium group in the first direction, data being recorded on the other magnetic recording medium by the first method.

2. The magnetic recording device according to claim 1, wherein
   the magnetic recording medium group includes a plurality of the first magnetic recording media,
   the magnetic head group includes a plurality of the first magnetic heads,
   one of the plurality of first magnetic heads is configured to record data on one of the plurality of first magnetic recording media by the first method, and
   no other magnetic recording medium on which data is recorded by the second method is provided between the plurality of first magnetic recording media.

3. The magnetic recording device according to claim 1, wherein
   an absolute value of a difference between a number of the plurality of second magnetic recording media and a number of the plurality of third magnetic recording media is 2 or less.

4. The magnetic recording device according to claim 1, wherein
   the first method includes a thermally-assisted magnetic recording.

5. The magnetic recording device according to claim 4, wherein
   the second method includes one of a magnetization control assisted magnetic recording, a current assisted magnetic recording, and a microwave assisted magnetic recording.

6. The magnetic recording device according to claim 5, wherein
   the first method includes an SMR (Shingled Magnetic Recording).

7. The magnetic recording device according to claim 6, wherein
   the second method includes a CMR (Conventional Magnetic Recording).

8. The magnetic recording device according to claim 5, wherein
   the first method includes one of a CMR (Conventional Magnetic Recording), an SMR (Shingled Magnetic Recording), and an IMR (interlaced magnetic recording), and
   the second method includes one of the CMR, the SMR, and the IMR.

9. The magnetic recording device according to claim 1, wherein
   a first vibration at a position of the first magnetic recording medium is smaller than a second vibration at a position of at least one of the plurality of second magnetic recording media, and
   the first vibration is smaller than a third vibration at a position of at least one of the plurality of third magnetic recording media.

10. The magnetic recording device according to claim 1, wherein
    a first recording frequency of recording on the first magnetic recording medium is lower than a second recording frequency of recording on the plurality of second magnetic recording media, and
    the first recording frequency is lower than a third recording frequency of recording on the plurality of third magnetic recording media.

11. The magnetic recording device according to claim 1, wherein
    a first recording density in the first magnetic recording medium is higher than a second recording density in the plurality of second magnetic recording media, and
    the first recording density is higher than a third recording density in the plurality of third magnetic recording media.

12. The magnetic recording device according to claim 1, wherein
- a first recording number of times at which a desired recording characteristic can be maintained in the first magnetic head is smaller than a second recording number of times at which the recording characteristics can be maintained in one of the plurality of second magnetic heads, and
- the first recording number of times is smaller than a third recording number of times at which the recording characteristics can be maintained in one of the plurality of third magnetic heads.

13. The magnetic recording device according to claim 1, further comprising:
- a controller configured to control the magnetic recording medium group and the magnetic head group,
- the controller being configured to perform a first operation,
- in the first operation, the controller records recording data recorded on at least one of the plurality of second magnetic recording media or the plurality of third magnetic recording media on the first magnetic recording media.

14. The magnetic recording device according to claim 13, wherein
- the controller is configured to perform the first operation in a case where an access frequency to the recording data recorded on the at least one of the plurality of second magnetic recording media or the plurality of third magnetic recording media is a first value or less.

15. The magnetic recording device according to claim 13, wherein
- the controller is configured to perform the first operation in a case where a remained area of the at least one of the plurality of second magnetic recording media or the plurality of third magnetic recording media becomes a second value or less.

16. The magnetic recording device according to claim 14, wherein
- the controller is configured to perform a second operation before the first operation, and
- the controller records the recording data in at least one of the plurality of second magnetic recording media or the plurality of third magnetic recording media in the second operation.

17. The magnetic recording device according to claim 14, wherein
- the first operation includes updating a correspondence between a logical address relating to the recording data and a physical address relating to the recording data.

18. The magnetic recording device according to claim 14, wherein
- the control is configured to perform a third operation, and
- in the third operation, the controller records other data at a position where the recording data being recorded of the at least one of the plurality of second magnetic recording media or the plurality of third magnetic recording media.

19. A magnetic recording system, comprising:
- the magnetic recording device according to claim 1; and
- a controller,
- the controller being configured to control the magnetic recording medium group and the magnetic head group,
- the controller being configured to perform a first operation,
- in the first operation, the controller being configured to record recording data recorded on at least one of the plurality of second magnetic recording media or the plurality of third magnetic recording media on the first magnetic recording media.

20. A method for control a magnetic recording device, comprising:
- controlling the magnetic recording device,
- the magnetic recording device, including:
  - a magnetic recording medium group, including
    - a first magnetic recording medium,
    - a plurality of second magnetic recording media, and
    - a plurality of third magnetic recording media; and
  - a magnetic head group, including
    - a first magnetic head,
    - a plurality of second magnetic heads, and
    - a plurality of third magnetic heads,
- the first magnetic head being configured to record data on the first magnetic recording medium by a first method,
- one of the plurality of second magnetic heads being configured to record data on one of the plurality of second magnetic recording media by a second method different from the first method,
- one of the plurality of third magnetic heads being configured to record data on one of the plurality of third magnetic recording media by the second method,
- the first magnetic recording medium being provided between the plurality of second magnetic recording media and the plurality of third magnetic recording media in a first direction, and
- no other magnetic recording medium overlapping the magnetic recording medium group in the first direction, data being recorded on the other magnetic recording medium by the first method,
- in the controlling, performing a first operation,
- in the first operation, recording data recorded on at least one of the plurality of second magnetic recording media and the plurality of third magnetic recording media are recorded on the first magnetic recording media.

* * * * *